United States Patent
Pretty

(10) Patent No.: US 11,268,637 B2
(45) Date of Patent: Mar. 8, 2022

(54) DRAIN MAST SEAL ASSEMBLY WITH SEAL WEDGE(S)

(71) Applicant: Rohr, Inc., Chula Vista, CA (US)

(72) Inventor: Sean Pretty, Jamul, CA (US)

(73) Assignee: Rohr, Inc., Chula Vista, CA (US)

( * ) Notice: Subject to any disclaimer, the term of this patent is extended or adjusted under 35 U.S.C. 154(b) by 185 days.

(21) Appl. No.: 16/674,950

(22) Filed: Nov. 5, 2019

(65) Prior Publication Data

US 2021/0131588 A1    May 6, 2021

(51) Int. Cl.
*F16L 5/10* (2006.01)
*B64D 29/06* (2006.01)

(52) U.S. Cl.
CPC ............... *F16L 5/10* (2013.01); *B64D 29/06* (2013.01)

(58) Field of Classification Search
None
See application file for complete search history.

(56) References Cited

U.S. PATENT DOCUMENTS

| 5,655,732 A | 8/1997 | Frank |
| 2008/0181770 A1 | 7/2008 | Russell |
| 2015/0337993 A1 | 11/2015 | Velarde |
| 2017/0002689 A1 | 1/2017 | Leon |
| 2017/0122128 A1 | 5/2017 | Lacko |
| 2018/0258851 A1 | 9/2018 | Ribarov |
| 2018/0283217 A1 | 10/2018 | De Pau, Jr. |
| 2019/0276131 A1 | 9/2019 | Parker |

FOREIGN PATENT DOCUMENTS

GB        466736 A     6/1937

OTHER PUBLICATIONS

EP search report for EP20205981.2 dated Apr. 6, 2021.

*Primary Examiner* — Alexander S Thomas
(74) *Attorney, Agent, or Firm* — Getz Balich LLC

(57) ABSTRACT

An assembly is provided for an aircraft propulsion system. A first seal wedge is configured with a first wedge-shaped cross-sectional geometry when viewed in a reference plane. A first aperture extends along a first axis within the first seal wedge. A second seal wedge is configured with a second wedge-shaped cross-sectional geometry when viewed in the reference plane. A second aperture extends along a second axis within the second seal wedge. A first drain tube supports the first seal wedge and is fluidly coupled with the first aperture. A second drain tube supports the second seal wedge and is fluidly coupled with the second aperture. A manifold is configured with an outlet. The manifold supports the first drain tube and the second drain tube. The manifold fluidly couples the first drain tube and the second drain tube in parallel with the outlet.

20 Claims, 12 Drawing Sheets

DRAIN MAST SEAL ASSEMBLY WITH SEAL WEDGE(S)

BACKGROUND

1. Technical Field

This disclosure relates generally to an aircraft propulsion system and, more particularly, to sealing an interface with a drain mast for an aircraft propulsion system nacelle.

2. Background Information

A nacelle for an aircraft propulsion system includes a sealed interface between various components of the nacelle, which nacelle component include a drain mast. While various sealed interface types and configurations are known in the art, there is still room in the art for improvement. There is a need in the art therefore an improved drain mast seal assembly.

SUMMARY OF THE DISCLOSURE

According to an aspect of the present disclosure, an assembly is provided for an aircraft propulsion system. This assembly includes a drain mast, a first seal wedge and a second seal wedge. The drain mast is configured with an elongated cross-sectional geometry when viewed in a reference plane. The elongated cross-sectional geometry has a major axis and a minor axis. The drain mast extends along the major axis between a first major axis side and a second major axis side. The first seal wedge is abutted against the first major axis side. The first seal wedge has a first wedge-shaped cross-sectional geometry when viewed in the reference plane. The second seal wedge is abutted against the second major axis side. The second seal wedge has a second wedge-shaped cross-sectional geometry when viewed in the reference plane.

According to another aspect of the present disclosure, another assembly is provided for an aircraft propulsion system. This assembly includes a first seal wedge, a second seal wedge, a first drain tube, a second drain tube and a manifold. The first seal wedge is configured with a first wedge-shaped cross-sectional geometry when viewed in a reference plane. A first aperture extends along a first axis within the first seal wedge, where the reference plane is perpendicular to the first axis. The second seal wedge is configured with a second wedge-shaped cross-sectional geometry when viewed in the reference plane. A second aperture extends along a second axis within the second seal wedge, where the reference plane is perpendicular to the second axis. The first drain tube supports the first seal wedge and is fluidly coupled with the first aperture. The second drain tube supports the second seal wedge and is fluidly coupled with the second aperture. The manifold is configured with an outlet. The manifold supports the first drain tube and the second drain tube. The manifold fluidly couples the first drain tube and the second drain tube in parallel with the outlet.

According to still another aspect of the present disclosure, another assembly is provided for an aircraft propulsion system. This assembly includes an elongated body, a first seal wedge, a second seal wedge, a first nacelle seal and a second nacelle seal. The first seal wedge is pressed against a first portion of the elongated body. The second seal wedge is pressed against a second portion of the elongated body that is opposite the first portion. The first nacelle seal is configured to be compressed against a third portion of the elongated body, a first side of the first seal wedge and a first side of the second seal wedge. The second nacelle seal is configured to be compressed against a fourth portion of the elongated body, a second side of the first seal wedge and a second side of the second seal wedge.

The elongated body may be configured as or otherwise include a drain mast.

The assembly may also include drain mast configured with an elongated cross-sectional geometry when viewed in the reference plane. The elongated cross-sectional geometry may have a major axis and a minor axis. The drain mast may extend along the major axis between a first major axis side and a second major axis side. A first seal wedge may be pressed against and slidably contact the first major axis side. A second seal wedge may be pressed against and slidably contact the second major axis side.

A first exterior surface of the first seal wedge may face away from the second seal wedge. A second exterior surface of the first seal wedge may face away from the second seal wedge. The second exterior surface may meet the first exterior surface at an outside corner. A third exterior surface of the first seal wedge may face towards the second seal wedge. The third exterior surface may extend between the first exterior surface and the second exterior surface. At least a portion of the third exterior surface may be concave.

The reference plane may be perpendicular to a centerline of the drain mast. The first seal wedge may be configured with the drain mast such that the first seal wedge is operable to slide against an exterior surface of the drain mast and thereby pivot about the centerline.

The first seal wedge may be axially fixed relative to the drain mast.

The assembly may also include a first drain tube, a second drain tube, a third drain tube and a manifold. The first drain tube may be attached to the first seal wedge and may be fluidly coupled with a first aperture in the first seal wedge. The second drain tube may be attached to the second seal wedge and may be fluidly coupled with a second aperture in the second seal wedge. The manifold may fluidly couple the first drain tube and the second drain tube in parallel with the third drain tube.

The manifold may be configured from or otherwise include elastomeric material.

The manifold may include a first branch, a second branch and a third branch. The first branch may be connected to and support the first drain tube. The second branch may be connected to and support the second drain tube. The third branch may be connected to the third drain tube.

The manifold may also include a first gusset and a second gusset. The first gusset may be connected to and extend between the first branch and the third branch. The second gusset may be connected to and extend between the second branch and the third branch.

The elongated cross-sectional geometry may be an elliptical cross-sectional geometry.

The first seal wedge may be configured from or otherwise include a fireproof material.

The first seal wedge may be configured from or otherwise include a polymeric material.

A first exterior surface of the first seal wedge may face away from the drain mast. A second exterior surface of the first seal wedge may face away from the drain mast. The second exterior surface may meet the first exterior surface at an outside corner. A third exterior surface of the first seal wedge may face towards and may be abutted against a portion of an exterior surface of the drain mast. The third exterior surface may extend between the first exterior surface and the second exterior surface.

The third exterior surface may be a concave surface.

The first exterior surface may include a planar segment and a concave segment.

A curvature of the third exterior surface may match a curvature of the portion of the exterior surface of the drain mast.

The assembly may include a first nacelle seal and a second nacelle seal. The first nacelle seal may be configured to be pressed against a first minor axis side of the drain mast, a first side of the first seal wedge and a first side of the second seal wedge. The second nacelle seal may be configured to be pressed against a second minor axis side of the drain mast, a second side of the first seal wedge, a second side of the second seal wedge, a first portion of the first nacelle seal and a second portion of the first nacelle seal.

The assembly may also include a nacelle stationary structure and a nacelle door. The first nacelle seal may be mounted to the nacelle stationary structure. The second nacelle seal may be mounted to the nacelle door.

The foregoing features and the operation of the invention will become more apparent in light of the following description and the accompanying drawings.

DETAILED DESCRIPTION

Figure 1:
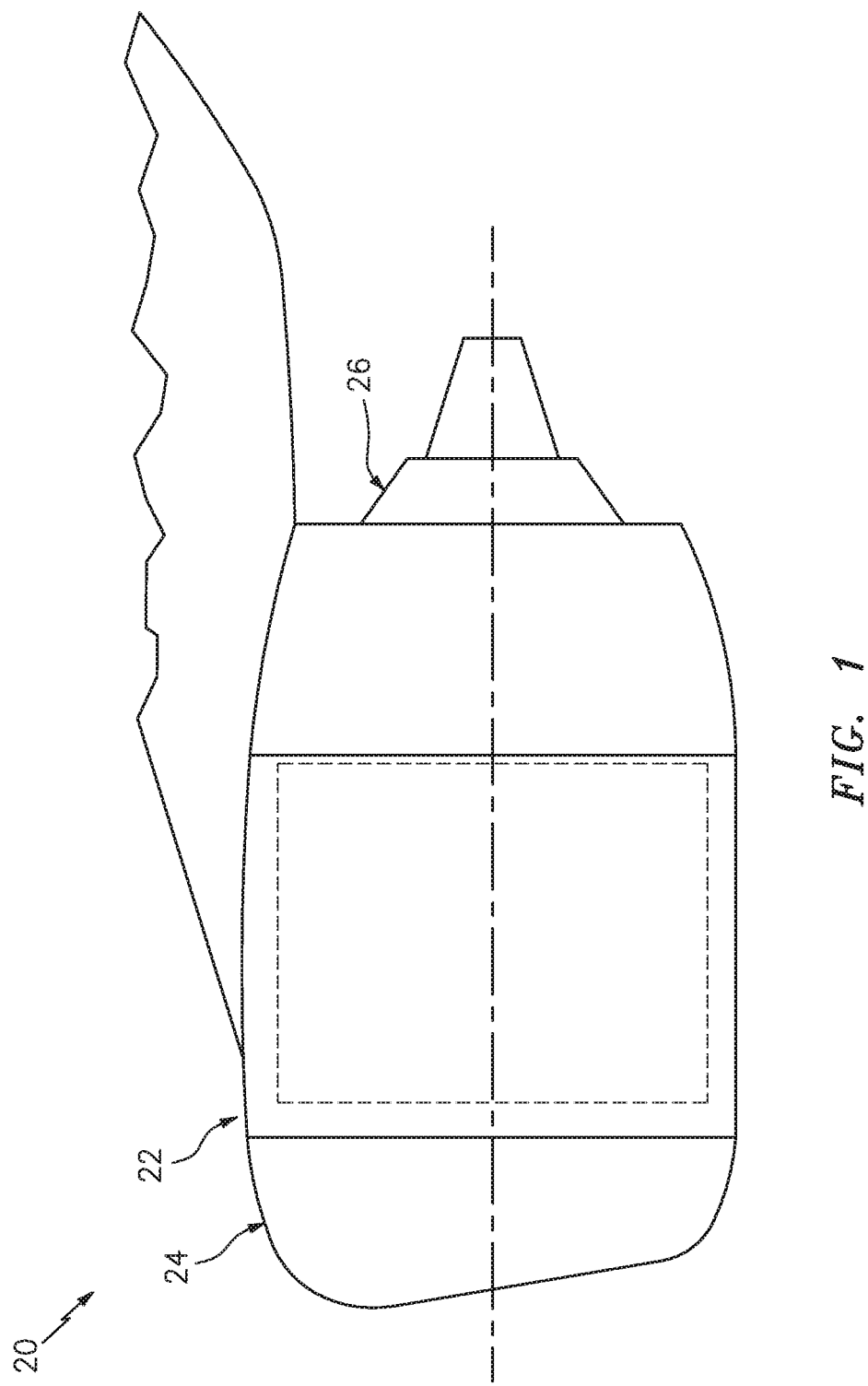
FIG. 1 is a side illustration of an aircraft propulsion system.

FIG. 1 illustrates an aircraft propulsion system 20 for an aircraft such as, but not limited to, a commercial airline or a cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 of FIG. 1 includes a nacelle outer structure 24 and a nacelle inner structure 26, which inner structure 26 may sometimes be referred to as an inner fixed structure (IFS). The inner structure 26 covers a core of the gas turbine engine, which core may include a compressor section, a combustor section and a turbine section. The outer structure 24 covers a fan section of the gas turbine engine. The outer structure 24 covers at least a forward portion of the inner structure 26 so as to form a bypass gas path/a bypass duct radially between the structures 24 and 26. The outer structure 24 may also be configured with a thrust reverser for redirecting airflow from the bypass gas path out of the nacelle 22 in a forward and outward direction. The present disclosure, however, is not limited to the foregoing exemplary general nacelle configuration.

Figure 2:
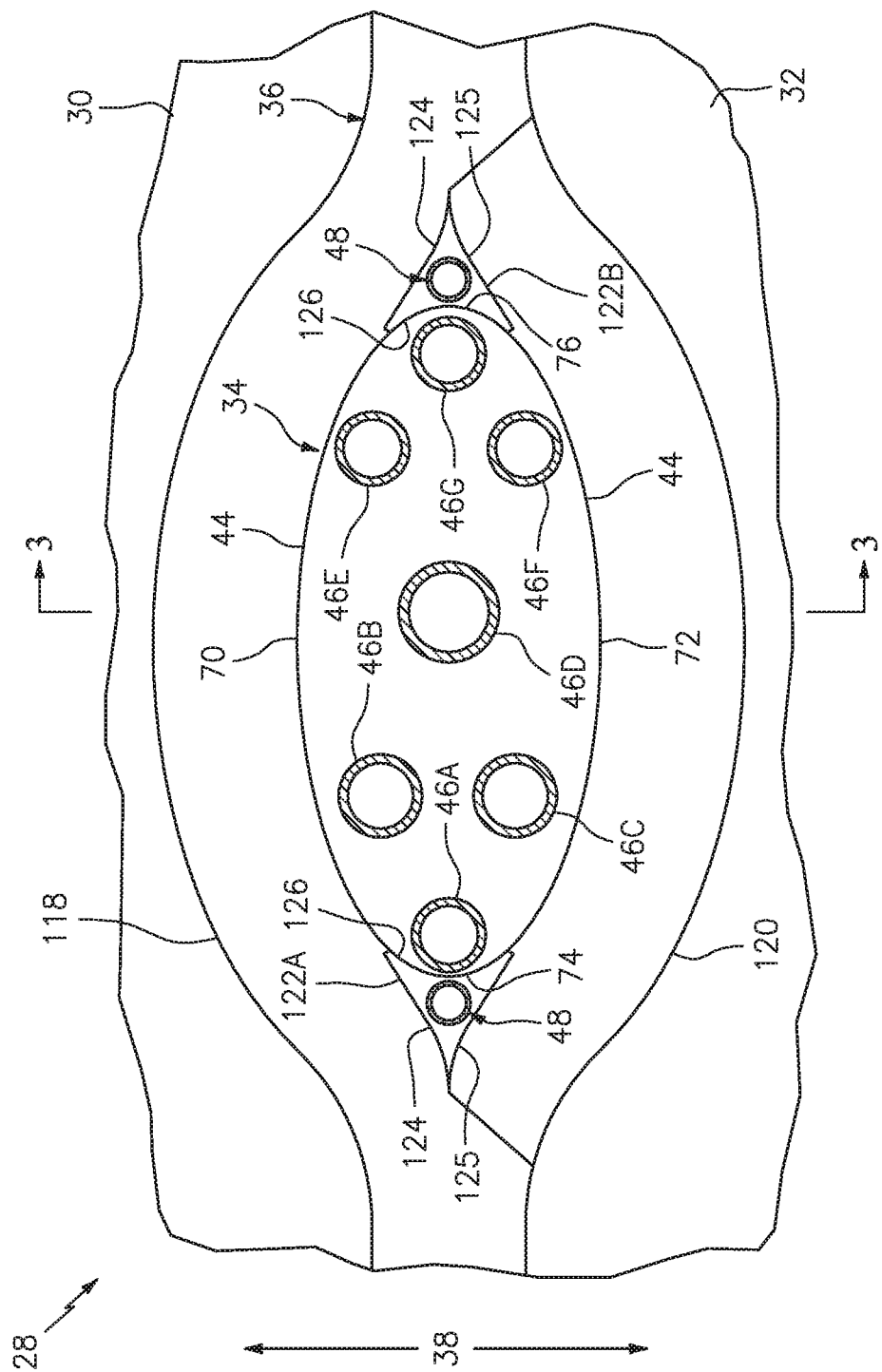
FIG. 2 is an illustration of a portion of an interface between components of a nacelle for the aircraft propulsion system, which components include a drain mast.

FIG. 2 illustrates a portion of an assembly 28 for the nacelle 22 of the aircraft propulsion system 20. This nacelle assembly 28 includes a first nacelle component 30, a second nacelle component 32 and a drain assembly 34. The nacelle assembly 28 also includes a seal assembly 36 for sealing a gap between the first nacelle component 30 and the second nacelle component 32 as well as around the drain assembly 34.

Figure 3:
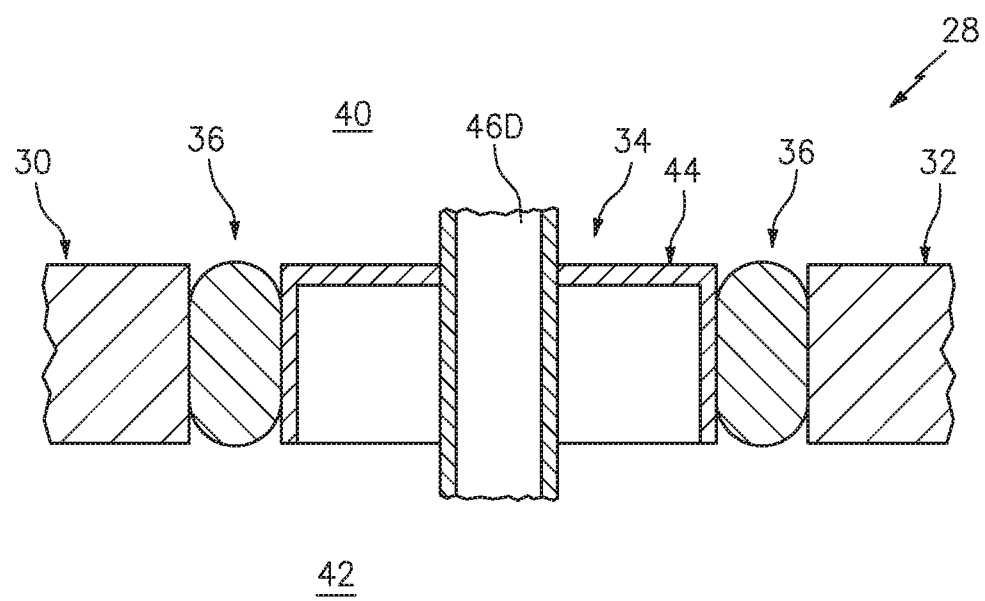
FIG. 3 is a sectional illustration of the interface taken along line 3-3 in FIG. 2.

One of the nacelle components (e.g., 30 or 32) may be configured as a stationary structure of the nacelle 22. The other one of the nacelle components (e.g., 32 or 30) may be configured as a door of the nacelle 22. This door may move back and forth along a trajectory 38 between an open position and a closed position (e.g., position of FIG. 2). Referring to FIG. 3, at least the nacelle components 30 and 32 may collectively provide a wall/divider between a first compartment 40 (e.g., a compartment between the gas turbine engine core and the inner fixed structure) and a second compartment 42 (e.g., a compartment within the nacelle 22).

Figure 4:
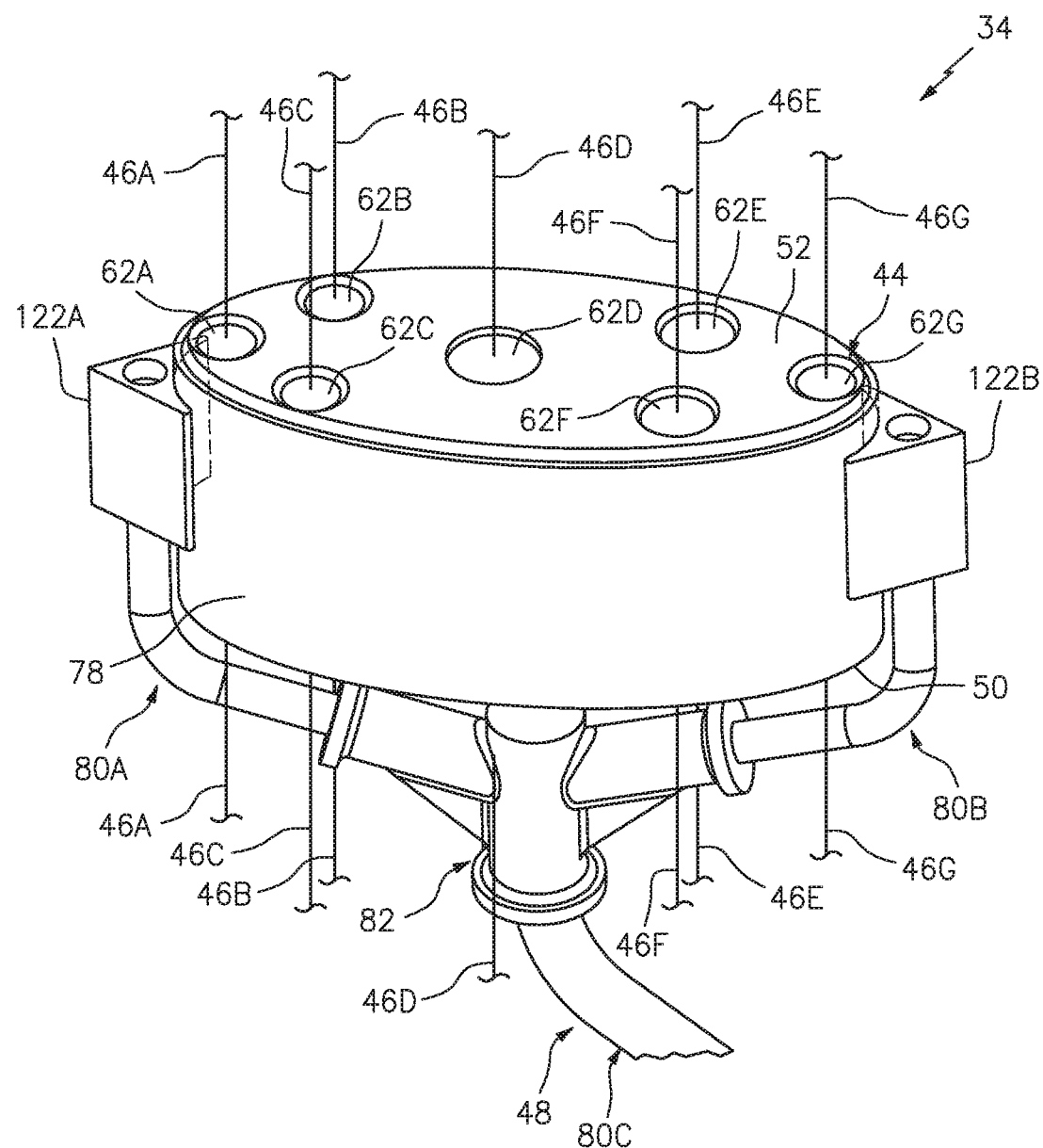
FIG. 4 is a perspective illustration of a drain assembly configured with seal wedges.

The drain assembly 34 of FIG. 4 includes a drain mast 44, an array of one or more (e.g., primary) drain tubes 46A-G (generally referred to as "46") and a (e.g., secondary) drain system 48.

Figure 5:
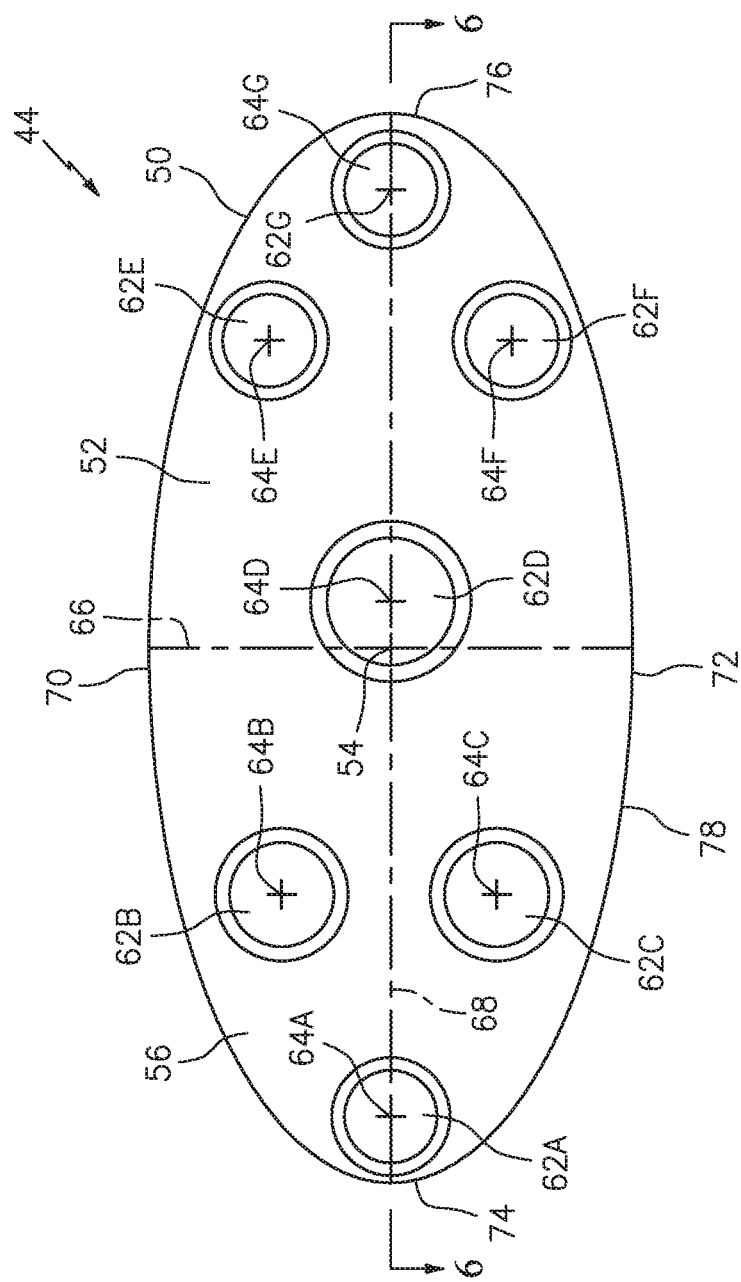
FIG. 5 is an illustration of a drain mast of the drain assembly.
Figure 6:
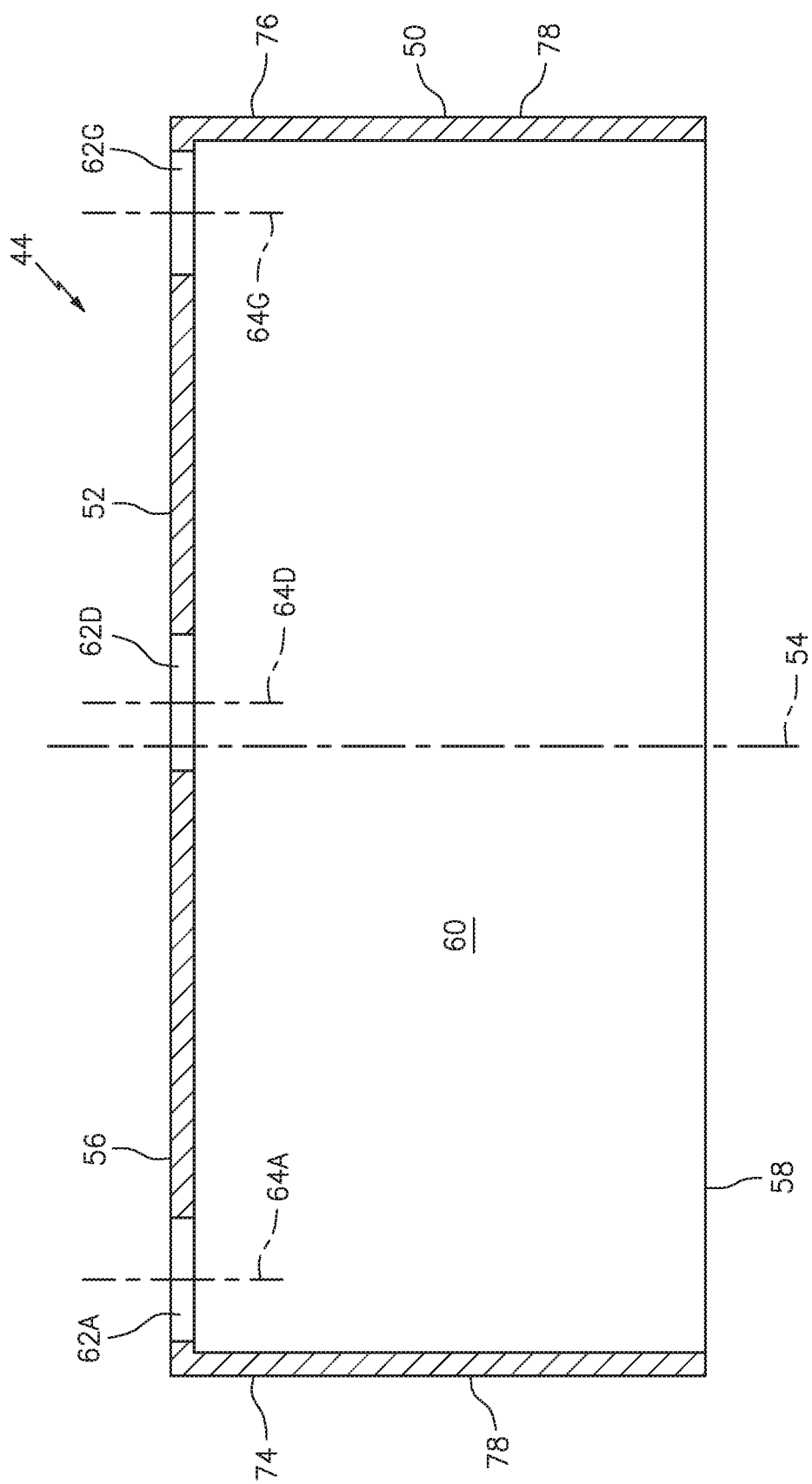
FIG. 6 is a sectional illustration of the drain mast taken along line 6-6 in FIG. 5.

Referring to FIGS. 4-6, the drain mast 44 may be configured with a hollow and/or cupped body. The drain mast 44 of FIGS. 5 and 6, for example, includes a tubular portion 50 and a plug portion 52 (e.g., an end cap). The tubular portion 50 extends axially along an axial centerline 54 between a first end 56 of the drain mast 44 and a second end 58 of the drain mast 44. The plug portion 52 may be located at (e.g., on, adjacent or proximate) the drain mast first end 56. Alternatively, the plug portion 52 may be located at an axially intermediate position between the ends 56 and 58, or at the drain mast second end 58. The plug portion 52 is configured to plug/cover a bore 60 of the tubular portion 50. Thus, the bore 60 of FIG. 6 extends partially into the drain mast 44 from the drain mast second end 58 to the plug portion 52.

Referring to FIGS. 5 and 6, the plug portion 52 is configured with one or more drain mast apertures 62A-G (generally referred to as "62"). Each of these drain mast apertures 62 may extend axially along a respective axis 64A-G (generally referred to as "64") through the plug portion 52. One or more or each of these axes 64 may be parallel with the centerline 54.

Referring to FIG. 5, the drain mast 44 and its components 50 and 52 are configured with an elongated cross-sectional geometry when viewed, for example, in a reference plane. This reference plane may be a plane that is perpendicular to the centerline 54; e.g., plane of FIG. 5. The term "reference plane" may describe an imaginary plane that extends through or is adjacent a body; e.g., the drain mast 44.

An example of the elongated cross-sectional geometry is an elliptical or oval cross-sectional geometry. The elongated cross-sectional geometry of FIG. 5 has a minor axis 66 and a major axis 68. The term "minor axis" may describe a minimum (shortest) diameter of an elongated shape such as an ellipse or an oval, which diameter extends through a center of the elongated shape. The term "major axis" may describe a maximum (longest) diameter of an elongated shape such as an ellipse or an oval, which diameter extends through a center of the elongated shape. In the embodiment of FIG. 5, the elongated cross-sectional geometry is symmetrical about both the major axis 68 and the minor axis 66. The present disclosure, however, is not limited to such an exemplary symmetrical elongated cross-sectional geometry.

The drain mast 44 extends along the minor axis 66 between a first minor axis side 70 and a second minor axis side 72 that is disposed opposite the first minor axis side 70. The drain mast 44 extends along the major axis 68 between a first major axis side 74 and a second major axis side 76 that is disposed opposite the first major axis side 74. The drain mast 44 has a tubular exterior surface 78 which extends circumferentially about (e.g., completely around) the drain mast 44 and the centerline 54. This exterior surface 78 is (e.g., completely) carried by the tubular portion 50.

The drain mast 44 may be configured as a monolithic body. The drain mast 44 may be constructed from or otherwise include metal. The present disclosure, however, is not limited to the foregoing exemplary drain mast material or configuration.

Figure 7A:
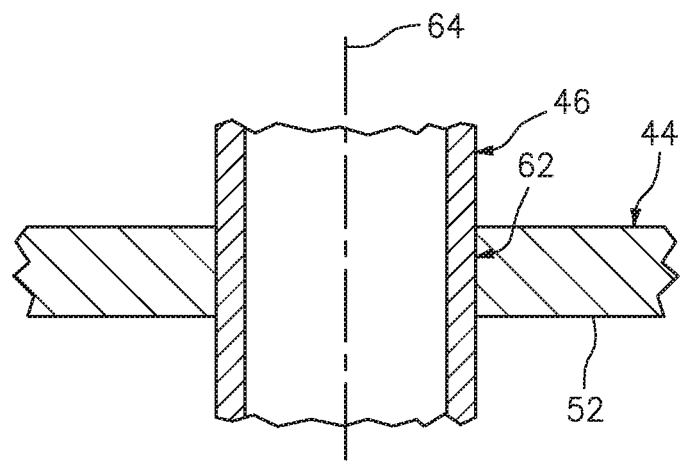
FIG. 7A is a sectional illustration of an interface between the drain mast and an unsegmented drain tube.
Figure 7B:
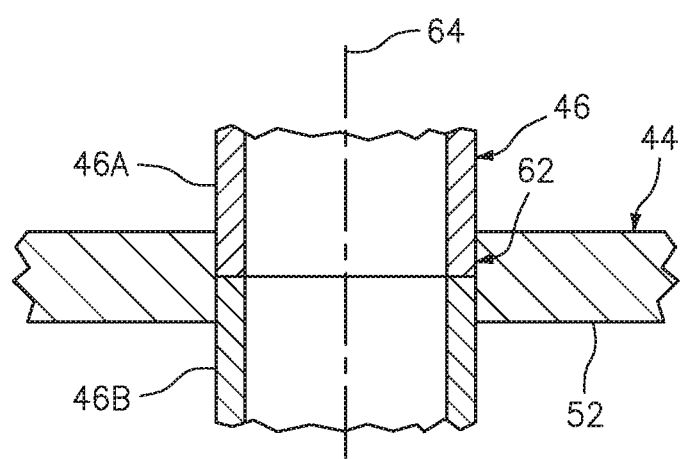
FIG. 7B is a sectional illustration of another interface between the drain mast and a segmented drain tube.

Referring to FIGS. 7A and 7B, each of the drain tubes 46 is configured as a length of conduit; e.g., pipe or hose. Each drain tube 46 is mated with a respective one of the drain mast apertures 62. For example, each drain tube 46 may project through the respective mast aperture 62 as shown in FIG. 7A. Alternatively, one or more sections 46A and 46B of one or more or each of the drain tubes 46 may extend partially into the respective mast aperture 62 as shown in FIG. 7B. Each drain tube 46 of FIGS. 7A and 7B may be connected to the drain mast 44 in such a fashion so that an interface between the drain mast 44 and the respective drain tube 46 is a sealed interface. Each drain tube 46, for example, may be welded, brazed and/or otherwise bonded to the drain mast 44 and its plug portion 52.

Each of the drain tubes 46 may be constructed from or otherwise include metal. The present disclosure, however, is not limited to the foregoing exemplary drain tube material.

Figure 8:
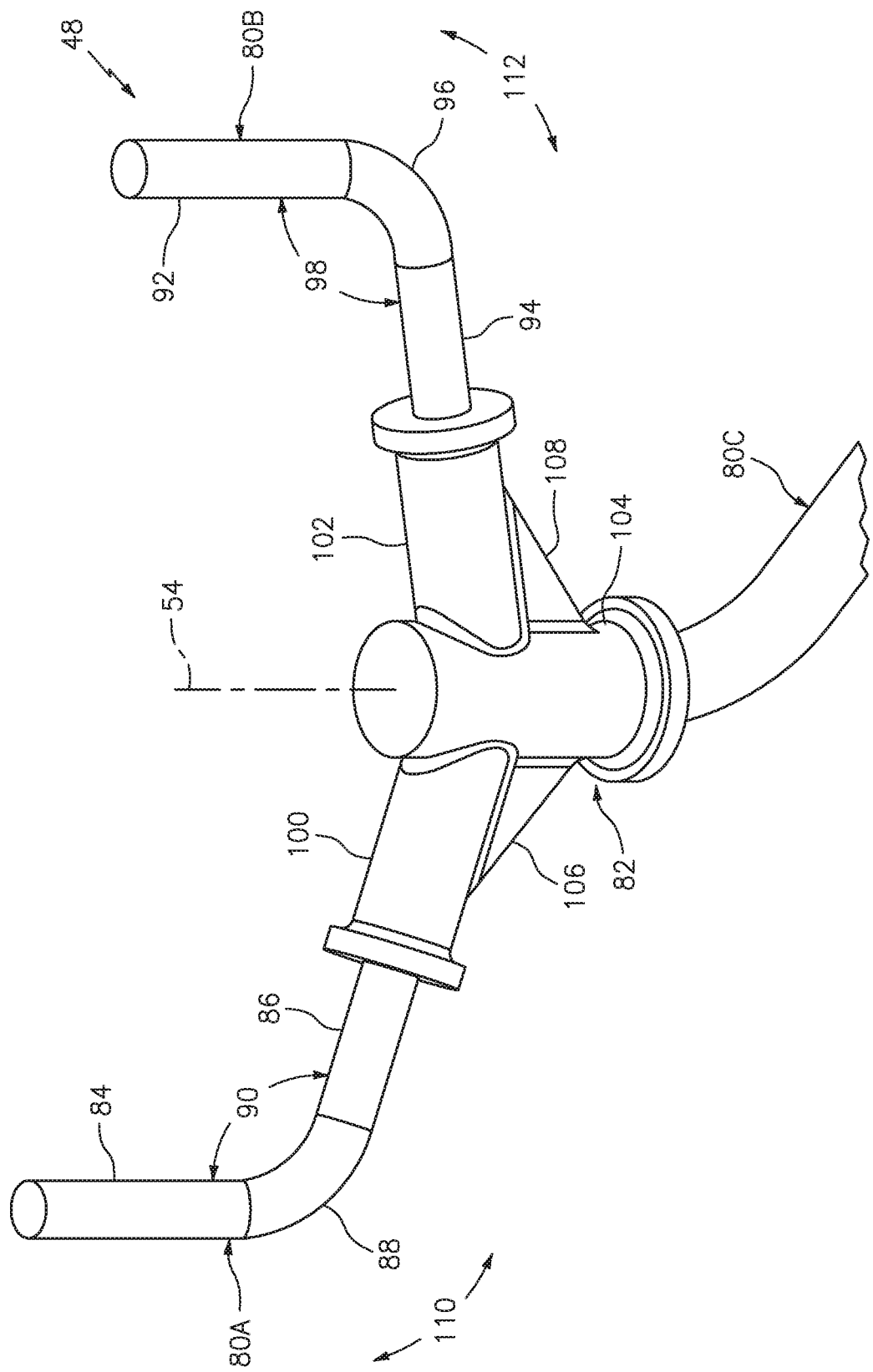
FIG. 8 is a perspective illustration of a portion of a drain system of the drain assembly.

Referring to FIG. 8, the drain system 48 includes one or more additional drain tubes 80A-C (generally referred to as "80") and a manifold 82. In the embodiment of FIG. 8, the additional drain tubes 80 include one or more inlet drain tubes 80A-B and at least one outlet drain tube 80C. Each of these drain tubes 80 is configured as a length of conduit; e.g., pipe or hose.

The first inlet drain tube 80A of FIG. 8 includes a first section 84 and a second section 86 which is fluidly coupled with the first section 84 at a corner section 88; e.g., an elbow. The second section 86 is angularly offset from the first section 84 by an included angle 90. This included angle 90 may be an obtuse angle. For example, the included angle 90 may be greater than ninety degrees (90°) and less than, for example, one-hundred and thirty-five degrees (135°). The included angle 90, however, may alternatively be a ninety degree angle or an acute angle.

The second inlet drain tube 80B of FIG. 8 includes a first section 92 and a second section 94 which is fluidly coupled with the first section 92 at a corner section 96; e.g., an elbow. The second section 94 is angularly offset from the first section 92 by an included angle 98. This included angle 98 may be an obtuse angle. For example, the included angle 98 may be greater than ninety degrees (90°) and less than, for example, one-hundred and thirty-five degrees (135°). The included angle 98, however, may alternatively be a ninety degree angle or an acute angle. In the embodiment of FIG. 8, the included angle 98 is equal to the included angle 90. Of course, in other embodiments, the included angle 98 may be different (e.g., greater or less) than the included angle 90.

Each of the drain tubes 80 may be constructed from or otherwise include metal. The present disclosure, however, is not limited to the foregoing exemplary drain tube material.

The manifold 82 may be configured as a multiple-to-one (e.g., a 2-to-1) coupling/fitting such as, but not limited to, a Y-coupling/fitting or a T-coupling/fitting. The manifold 82 of FIG. 8, for example, is configured to fluidly couple the first inlet drain tube 80A and the second inlet drain tube 80B, in parallel, to the outlet drain tube 80C. The manifold 82 is thereby configured to direct fluid received from both of the inlet drain tubes 80A-B into the outlet drain tube 80C. The manifold 82 is also configured to support and locate the inlet drain tubes 80A-B such that, for example, their first sections 84 and 92 are each parallel with the centerline 54 and within a certain proximity of the drain mast 44 as described below in further detail.

The manifold 82 of FIG. 8 includes a tubular first inlet branch 100, a tubular second inlet branch 102 and a tubular outlet branch 104. These branches 100, 102 and 104 are interconnected with one another so as to form, for example, a Y-coupling/fitting or a T-coupling/fitting. In particular, the first inlet branch 100 projects out from and is cantilevered from a first side of the outlet branch 104. The second inlet branch 102 projects out from and is cantilevered from a second side of the outlet branch 104 which is opposite the first side.

Figure 9:
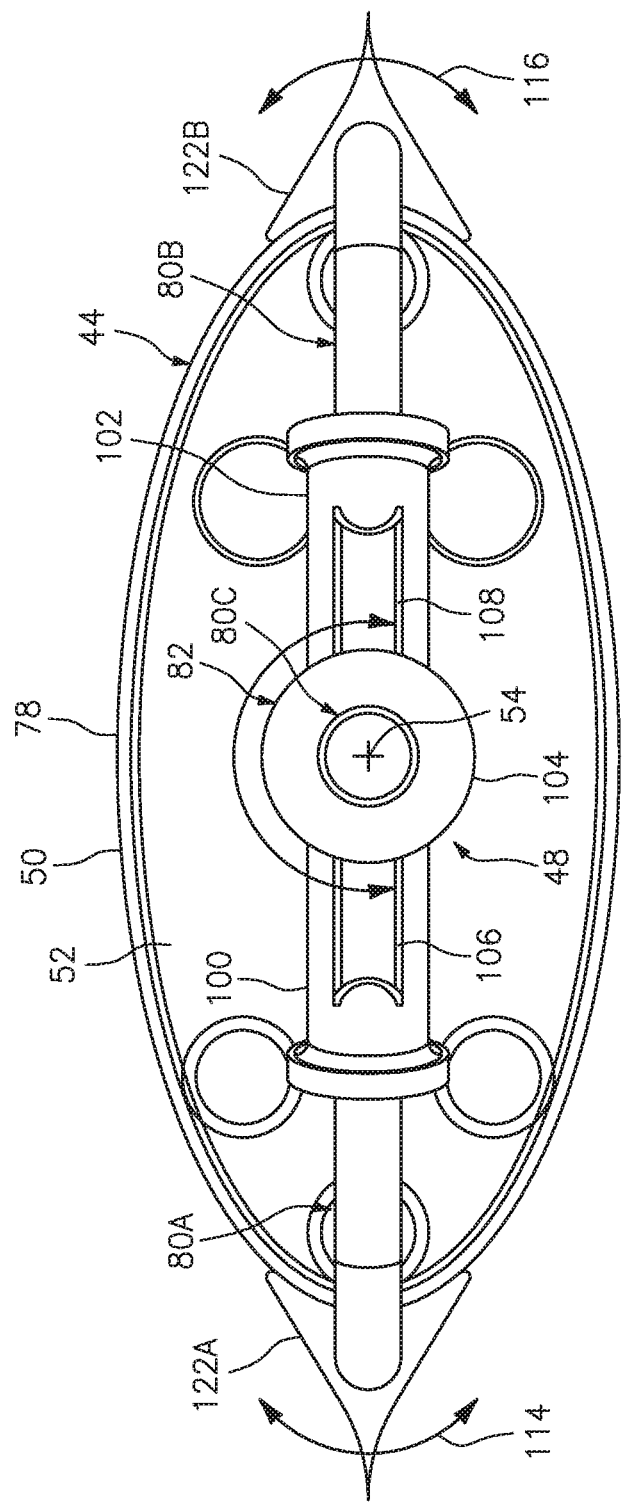
FIG. 9 is an illustration of the drain assembly configured with the seal wedges.

The first inlet branch 100 may be supported by a first support 106; e.g., a gusset. This first support 106 is connected to and extends between the first inlet branch 100 and the outlet branch 104. Similarly, the second inlet branch 102 may be supported by a second support 108; e.g., a gusset. This second support 108 is connected to and extends between the second inlet branch 102 and the outlet branch 104. The first and the second supports 106 and 108 are provided to respectively ensure the first and the second inlet branches 100 and 102 and, thus, elements connected thereto do not move (e.g., pivot) within a plane parallel with the centerline 54; e.g., plane of FIG. 8. For example, the first and the second supports 106 and 108 may prevent the inlet branches 100 and 102 and elements (e.g., 80A and 80B) connected thereto from pivoting along respective trajectories 110 and 112. By contrast, referring to FIG. 9, the inlet branches 100 and 102 and, thus, elements (e.g., 80A, 80B, 122A and 122B) connected thereto may be operable to move (e.g., slightly pivot) in a plane perpendicular to the centerline 54; e.g., plane of FIG. 9. For example, the manifold 82 may be configured such that the inlet branches 100 and 102 and elements (e.g., 80A, 80B, 122A and 122B) connected thereto may pivot back and forth along respective trajectories 114 and 116.

To enable the movement of the inlet branches 100 and 102, the manifold 82 may be constructed from or otherwise include a flexible material. This flexible material may be a polymeric material such as, but not limited to, an elastomeric material. The elastomeric material may be a fireproof elastomeric material. Such a fireproof elastomeric material may include, but is not limited to, silicon, fiberglass, Nomex® material (developed by DuPont de Nemours, Inc.) and/or Nextel® material (developed by 3M Company). The present disclosure, however, is not limited to the foregoing exemplary materials Referring to FIG. 2, the seal assembly 36 includes one or more nacelle seals 118 and 120 and one or more seal wedges 122A and 122B (generally referred to as "122"). Each of the nacelle seals 118 and 120 may be configured as a compliant/resilient (e.g., bulb) gasket that at least partially follows along and is attached to an edge of a respective one of the nacelle components 30 and 32. In the specific embodiment of FIG. 2, the first nacelle seal 118 has a first longitudinal length that is greater than a second longitudinal length of the second nacelle seal 120, where the second longitudinal length is approximately equal to (e.g., between 90% and 115%) one-half of a circumferential about the drain mast 44. The first longitudinal length may be approximately equal to (e.g., between 80% and 120%) a length of the interface between the first nacelle component 30 and the second nacelle component 32.

Each of the nacelle seals 118 and 120 may be constructed from or otherwise include a fireproof elastomeric material. Such a fireproof elastomeric material may include, but is not limited to, silicon, fiberglass, Nomex® material (developed by DuPont de Nemours, Inc.) and/or Nextel® material (developed by 3M Company). The present disclosure, however, is not limited to the foregoing exemplary nacelle seal materials.

Figure 10:
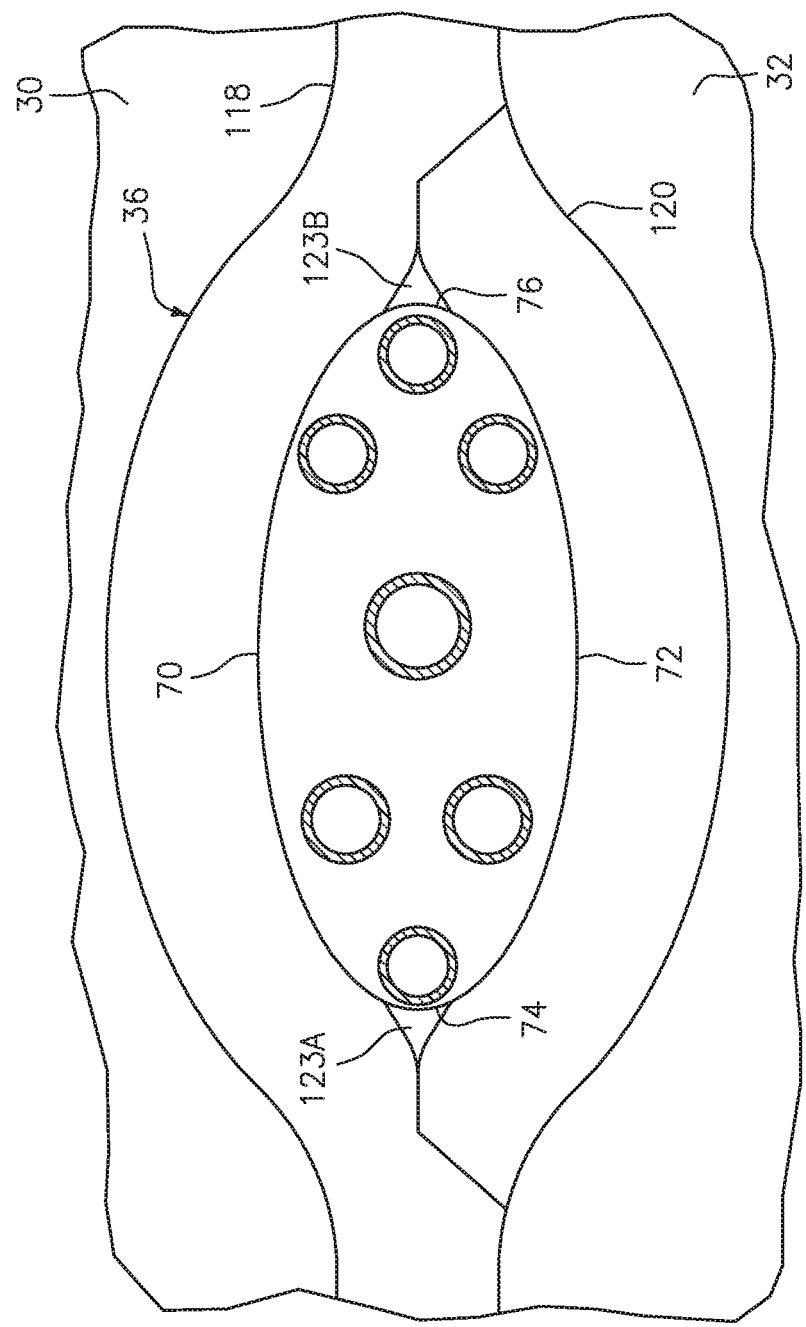
FIG. 10 is an illustration of a portion of the interface of FIG. 2 configured without the seal wedges.

FIG. 10 illustrates the nacelle assembly 28 of FIG. 2 configured without the seal wedges 122. When the nacelle components 30 and 32 are arranged together in the closed position (position of FIG. 10), each of the nacelle seals 118 and 120 engages (e.g., contacts and is pressed and/or compressed against) a respective minor axis side 70, 72 of the drain mast 44. Each of the nacelle seals 118 and 120 also engages (e.g., contacts and is pressed and/or compressed against) one or more portions of the other nacelle seal 118, 120. The nacelle seals 118 and 120 thereby may substantially seal the interface between the nacelle components 30 and 32 as well as the interface between each nacelle component 30, 32 and the drain mast 44. However, flexure/compression of one or both of the nacelle seals 118 and 120 may result in gaps 123A-B (generally referred to as "123") at the major axis sides 74 and 76 of the drain mast 44. Given the elongated cross-sectional geometry of the drain mast 44, each of the gaps 123 may have a wedge-shaped cross-sectional geometry when viewed in the reference plane (e.g., the plane of FIG. 10). In order to seal these gaps 123, the seal wedges 122 are provided as shown in FIG. 2. In particular, each seal wedge 122 is positioned at a respective major axis side 74, 76 of the drain mast 44 and engaged with (e.g., is abutted and pressed against) the exterior surface 78 of the drain mast 44 so as to plug a respective one of the gaps 123 shown in FIG. 10. With this arrangement, each of the nacelle seals 118 and 120 also engages (e.g., contacts and is pressed and/or compressed against) a respective side of the seal wedges 122.

Figure 11:
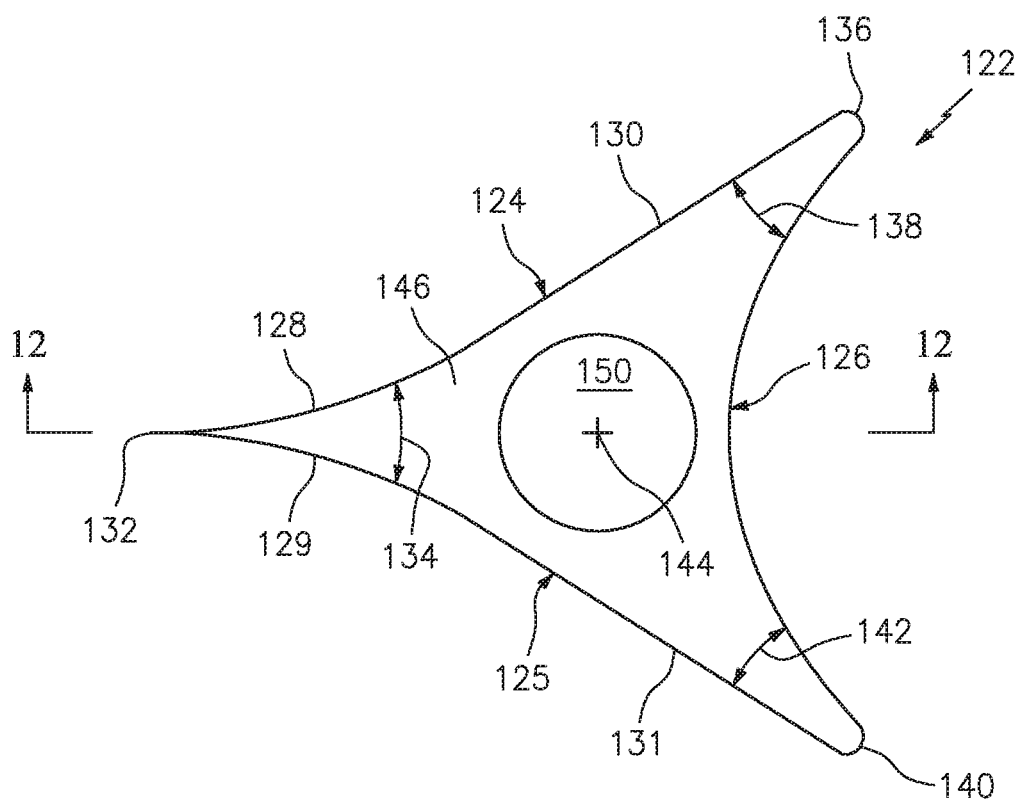
FIG. 11 is an illustration of an exemplary one of the seal wedges.

Referring to FIG. 11, each of the seal wedges 122 has a wedge-shaped (e.g., generally triangular) cross-sectional geometry when viewed in the reference plane; e.g., plane of FIG. 11. The seal wedge 122 of FIG. 11, for example, includes a plurality of wedge exterior surfaces 124-126.

The first exterior surface 124 is arranged to face away from the drain mast 44 and the other seal wedge 122 (see FIG. 1). This first exterior surface 124 is also configured to engage the first nacelle seal 118 (see FIG. 1).

The second exterior surface 125 is similarly arranged to face away from the drain mast 44 and the other seal wedge 122 (see FIG. 1). This second exterior surface 125 is also configured to engage the second nacelle seal 120 (see FIG. 1).

Each of the first and the second exterior surfaces 124 and 125 may have a non-planar geometry. Each exterior surface 124, 125, for example, includes a curved/(e.g., concave) segment 128, 129 and a planar segment 130, 131. The second exterior surface 125 may be a mirror image of the first exterior surface 124. The second exterior surface 125 meets the first exterior surface 124 at an outside corner 132 of the seal wedge 122. This outside corner 132 may be relatively sharp; e.g., an angle 134 between the surfaces 124 and 125 at the corner 132 may be less than, for example, thirty degrees; e.g., less than ten or twenty degrees.

The third exterior surface 126 is arranged to face towards the drain mast 44 and the other seal wedge 122 (see FIG. 1). This third exterior surface 126 is also configured to engage the drain mast 44 (see FIG. 1). The third exterior surface 126 may have a non-planar geometry. The third exterior surface 126 of FIG. 11, for example, is or includes a curved (e.g., concave) surface. A curvature of the third exterior surface 126, in particular, is configured to follow a curvature of the exterior surface 78 of the drain mast 44 at a respective one of the major axis sides 74, 76 (see FIG. 1).

The third exterior surface 126 extends between the first exterior surface 124 and the second exterior surface 125. The third exterior surface 126 may meet the first exterior surface 124 at a first inside corner 136 of the seal wedge 122. This first inside corner 136 may be relatively sharp; e.g., an angle 138 between the surfaces 124 and 126 at the corner 136 may be less than, for example, thirty degrees; e.g., less than ten or twenty degrees. The third exterior surface 126 may also or alternatively meet the second exterior surface 125 at a second inside corner 140 of the seal wedge 122. This second inside corner 140 may be relatively sharp; e.g., an angle 142 between the surfaces 125 and 126 at the corner 140 may be less than, for example, thirty degrees; e.g., less than ten or twenty degrees. In contrast to the outside corner 132, however, tips of one or both of the inside corners 136 and 140 may be blunt; e.g., rounded.

Figure 12:
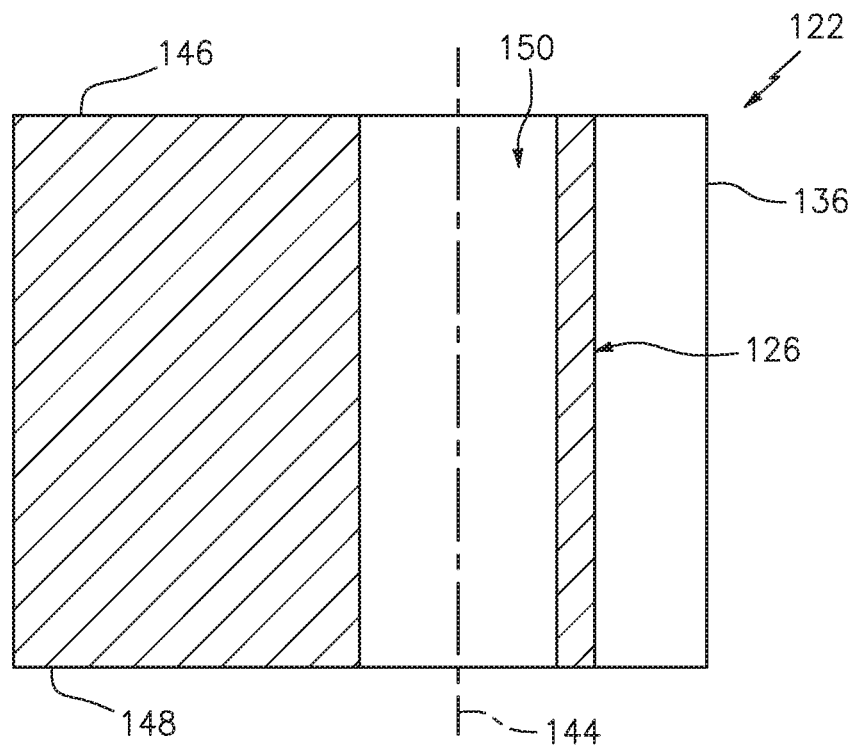
FIG. 12 is a sectional illustration of the exemplary seal wedge taken along line 12-12 in FIG. 11.

Referring to FIG. 12, each of the seal wedges 122 extends along a respective axis 144 between a first wedge end 146 and a second wedge end 148, where the axis 144 may be parallel with the centerline 54. Each of the seal wedges 122 is configured with a seal wedge aperture 150. This seal wedge aperture 150 extends along the axis 144 through the respective seal wedge 122; e.g., between the first and second wedge ends 146 and 148.

Each of the seal wedges 122 may be constructed from or otherwise include a relatively stiff and/or fireproof material. This material may be a polymeric material such as, but not limited to, an elastomeric material. The elastomeric material may be a fireproof elastomeric material. Such a fireproof elastomeric material may include, but is not limited to, silicon, fiberglass, Nomex® material (developed by DuPont de Nemours, Inc.) and/or Nextel® material (developed by 3M Company). The present disclosure, however, is not limited to the foregoing exemplary materials.

Figure 13:
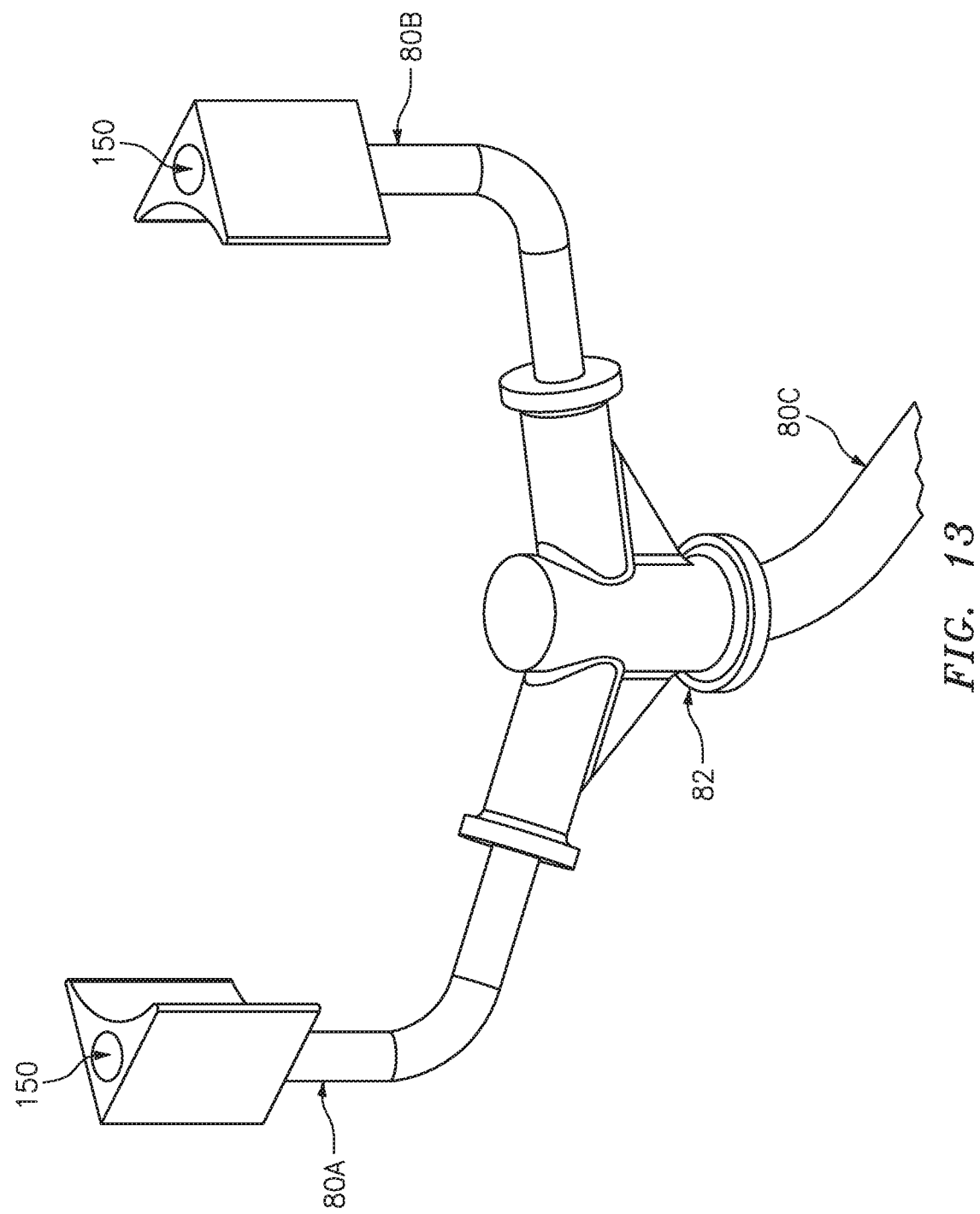
FIG. 13 is a perspective illustration of the drain system with the seal wedges.

Referring to FIG. 13, each of the seal wedges 122 is mounted to a respective one of the inlet drain tubes 80A-B. For example, the inlet drain tube 80 may be inserted into or otherwise fluidly coupled with the seal wedge aperture 150.

As described above with respect to FIG. 9, the manifold 82 is configured to enable slight movement of its inlet branches 100 and 102 and, thus, elements connected thereto the plane perpendicular to the centerline 54. As a result, each of the seal wedges 122 is operable to also slightly move in that plane. This enables each seal wedge 122 and its third exterior surface 126 to slide against the drain mast 44 and a respective portion of its exterior surface 78 and thereby move (e.g., pivot) about the centerline 54. This in turn enables the seal wedges 122 to slightly move when the nacelle components 30 and 32 (see FIG. 2) are closed and accommodate/compensate for distortion to the nacelle seals 118 and 120 during their compression. However, given the provision of the supports 106 and 108, the seal wedges 122 are fixed axially along the centerline 54 relative to the drain mast 44.

The seal wedges 122 are described above in combination with the drain mast 44. In other embodiments, however, the seal wedges 122 may alternatively be configured with another body (e.g., an elongated/oval/elliptical body) which is arranged in sealing engagement between two other bodies; e.g., the nacelle components 30 and 32. In other words, the seal wedges 122 and its associated drain system 48 may be configured for further sealing any interface between any aircraft propulsion system (e.g., nacelle or engine) body that is between and/or projects through an interface between a plurality of sealed bodies of the aircraft propulsion system; e.g., the nacelle components 30 and 32. The present disclosure therefore is not limited to drain mast applications. However, the non-seal mast body may have a cross-sectional geometry as described above with respect to the drain mast 44.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a drain mast configured with an elongated cross-sectional geometry when viewed in a reference plane, the elongated cross-sectional geometry having a major axis and a minor axis, and the drain mast extending along the major axis between a first major axis side and a second major axis side;
    a first seal wedge abutted against the first major axis side, the first seal wedge comprising a first wedge-shaped cross-sectional geometry when viewed in the reference plane; and
    a second seal wedge abutted against the second major axis side, the second seal wedge comprising a second wedge-shaped cross-sectional geometry when viewed in the reference plane.

2. The assembly of claim 1, wherein
    the reference plane is perpendicular to a centerline of the drain mast; and
    the first seal wedge is configured with the drain mast such that the first seal wedge is operable to slide against an exterior surface of the drain mast and thereby pivot about the centerline.

3. The assembly of claim 2, wherein the first seal wedge is axially fixed relative to the drain mast.

4. The assembly of claim 1, further comprising:
    a first drain tube attached to the first seal wedge and fluidly coupled with a first aperture in the first seal wedge;
    a second drain tube attached to the second seal wedge and fluidly coupled with a second aperture in the second seal wedge;
    a third drain tube; and
    a manifold fluidly coupling the first drain tube and the second drain tube in parallel with the third drain tube.

5. The assembly of claim 4, wherein the manifold comprises an elastomeric material.

6. The assembly of claim 4, wherein
    the manifold includes a first branch, a second branch and a third branch;
    the first branch is connected to and supports the first drain tube;
    the second branch is connected to and supports the second drain tube; and
    the third branch is connected to the third drain tube.

7. The assembly of claim 6, wherein
    the manifold further comprises a first gusset and a second gusset;
    the first gusset is connected to and extends between the first branch and the third branch; and
    the second gusset is connected to and extends between the second branch and the third branch.

8. The assembly of claim 1, wherein the elongated cross-sectional geometry is an elliptical cross-sectional geometry.

9. The assembly of claim 1, wherein the first seal wedge comprises a fireproof material.

10. The assembly of claim 1, wherein the first seal wedge comprises a polymeric material.

11. The assembly of claim 1, wherein
    a first exterior surface of the first seal wedge faces away from the drain mast;
    a second exterior surface of the first seal wedge faces away from the drain mast, and the second exterior surface meets the first exterior surface at an outside corner;
    a third exterior surface of the first seal wedge faces towards and is abutted against a portion of an exterior surface of the drain mast, and the third exterior surface extends between the first exterior surface and the second exterior surface.

12. The assembly of claim 11, wherein the third exterior surface is a concave surface.

13. The assembly of claim 11, wherein the first exterior surface includes a planar segment and a concave segment.

14. The assembly of claim 11, wherein a curvature of the third exterior surface matches a curvature of the portion of the exterior surface of the drain mast.

15. The assembly of claim 1, further comprising
    a first nacelle seal configured to be pressed against a first minor axis side of the drain mast, a first side of the first seal wedge and a first side of the second seal wedge; and
    a second nacelle seal configured to be pressed against a second minor axis side of the drain mast, a second side of the first seal wedge, a second side of the second seal wedge, a first portion of the first nacelle seal and a second portion of the first nacelle seal.

16. The assembly of claim 15, further comprising
a nacelle stationary structure; and
a nacelle door;
wherein the first nacelle seal is mounted to the nacelle stationary structure, and the second nacelle seal is mounted to the nacelle door.

17. An assembly for an aircraft propulsion system, comprising:
a first seal wedge configured with a first wedge-shaped cross-sectional geometry when viewed in a reference plane, a first aperture extending along a first axis within the first seal wedge, wherein the reference plane is perpendicular to the first axis;
a second seal wedge configured with a second wedge-shaped cross-sectional geometry when viewed in the reference plane, a second aperture extending along a second axis within the second seal wedge, wherein the reference plane is perpendicular to the second axis;
a first drain tube supporting the first seal wedge and fluidly coupled with the first aperture;
a second drain tube supporting the second seal wedge and fluidly coupled with the second aperture; and
a manifold configured with an outlet, the manifold supporting the first drain tube and the second drain tube, and the manifold fluidly coupling the first drain tube and the second drain tube in parallel with the outlet.

18. The assembly of claim 17, further comprising:
a drain mast configured with an elongated cross-sectional geometry when viewed in the reference plane, the elongated cross-sectional geometry having a major axis and a minor axis, and the drain mast extending along the major axis between a first major axis side and a second major axis side;
a first seal wedge pressed against and slidably contacting the first major axis side; and
a second seal wedge pressed against and slidably contacting the second major axis side.

19. The assembly of claim 17, wherein
a first exterior surface of the first seal wedge faces away from the second seal wedge;
a second exterior surface of the first seal wedge faces away from the second seal wedge, and the second exterior surface meets the first exterior surface at an outside corner;
a third exterior surface of the first seal wedge faces towards the second seal wedge, the third exterior surface extends between the first exterior surface and the second exterior surface, and at least a portion of the third exterior surface is concave.

20. An assembly for an aircraft propulsion system, comprising:
an elongated body;
a first seal wedge pressed against a first portion of the elongated body;
a second seal wedge pressed against a second portion of the elongated body that is opposite the first portion;
a first nacelle seal configured to be compressed against a third portion of the elongated body, a first side of the first seal wedge and a first side of the second seal wedge; and
a second nacelle seal configured to be compressed against a fourth portion of the elongated body, a second side of the first seal wedge and a second side of the second seal wedge.

* * * * *